United States Patent [19]

Yokota et al.

[11] Patent Number: 5,260,627

[45] Date of Patent: Nov. 9, 1993

[54] APPARATUS FOR DEFLECTING ELECTRON BEAMS AND COLOR CATHODE RAY TUBE APPARATUS INCORPORATING THIS DEFLECTING APPARATUS

[75] Inventors: Masahiro Yokota, Kumagaya; Yuichi Hosoi, Fukaya, both of Japan

[73] Assignee: Kabushiki Kaisha Toshiba, Kawasaki, Japan

[21] Appl. No.: 976,421

[22] Filed: Nov. 13, 1992

[30] Foreign Application Priority Data

| | | |
|---|---|---|
| Nov. 13, 1991 [JP] | Japan | 3-296946 |
| Oct. 23, 1992 [JP] | Japan | 4-286012 |
| Oct. 23, 1992 [JP] | Japan | 4-286013 |

[51] Int. Cl.$^5$ .................. H01J 29/70; H01J 29/76
[52] U.S. Cl. .................. 315/400; 315/371; 315/368.28
[58] Field of Search .................. 315/400, 371, 368.28

[56] References Cited

U.S. PATENT DOCUMENTS

| | | | |
|---|---|---|---|
| 3,944,884 | 3/1976 | Wilocki | 315/400 |
| 4,547,707 | 10/1985 | Yabase . | |
| 4,704,564 | 11/1987 | Ito et al. . | |
| 4,818,919 | 4/1989 | Kobayashi et al. . | |

FOREIGN PATENT DOCUMENTS

| | | |
|---|---|---|
| 0266181 | 5/1988 | European Pat. Off. . |
| 61-65658 | 5/1986 | Japan . |
| 63-195935 | 8/1988 | Japan . |
| 1183042 | 7/1989 | Japan . |

*Primary Examiner*—Theodore M. Blum
*Attorney, Agent, or Firm*—Cushman, Darby & Cushman

[57] ABSTRACT

A deflecting apparatus includes a saturable reactor, and this saturable reactor is constituted by a first saturation control coil and a second saturation control coil for generating a magnetic field having an opposite polarity to that of the first saturation control coil. The first saturation control coil is connected to a resistor to form a first deflection current system, and the second saturation control coil is connected in series with a pair of diodes that are connected to have opposite polarities, thereby forming a second deflection current system connected in parallel with the first deflection current system. The first and second saturation control coils are magnetically coupled to first and second impedance control coils respectively connected to horizontal deflection coils. Thus, a horizontal deflection current is controlled by the first and second impedance control coils in accordance with the vertical deflection current flowing through the first and second saturation control coils, thereby adjusting the horizontal deflection magnetic field in accordance with vertical deflection of the electron beams. As a result, a cross convergence error between the pair of side beams can be corrected simultaneously. This correction can be performed even when the deviation amounts of the cross convergence error differ among the intermediate and upper and lower end portions of the screen.

12 Claims, 13 Drawing Sheets

APPARATUS FOR DEFLECTING ELECTRON BEAMS AND COLOR CATHODE RAY TUBE APPARATUS INCORPORATING THIS DEFLECTING APPARATUS

BACKGROUND OF THE INVENTION

1. Field of the Invention

The present invention relates to a deflecting apparatus for a color cathode ray tube and a color cathode ray tube apparatus, and more particularly, to a deflecting apparatus for a color cathode ray tube which has a saturable reactor for changing a horizontal deflection current flowing through a horizontal deflection coil that generates a magnetic field deflected in a direction parallel to a direction along which electron beams are aligned, in synchronism with a vertical deflection current flowing through a vertical deflection coil that generates a magnetic field deflected in a direction perpendicular to the electron beam aligning direction, and a color cathode ray tube apparatus.

2. Description of the Related Art

Generally, a color cathode ray tube apparatus shown in FIG. 1 has an envelope having a panel 1 and a funnel 2 that are integrally bonded to each other. A shadow mask 3 having a large number of apertures formed therein to pass electron beams therethrough is mounted on the inner side of the panel 1, and a phosphor screen 4 having a three color phosphor layers that emit blue light, green light, and red light is formed on the inner surface of the panel 1 to oppose the shadow mask 3. In this color cathode ray tube apparatus, three electron beams BR, BG, and BB emitted from an electron gun assembly 6 disposed in a neck 5 of the funnel 2 are deflected in the horizontal and vertical directions by a magnetic field generated by a deflection yoke 7 mounted on the outer side of the funnel 2 to scan the phosphor screen 4. As the result of this electron beam defection scanning, a color image is displayed on the phosphor screen 4.

The deflection yoke 7 for deflecting the electron beams BR, BG, and BB is usually constituted by a pair of saddle type horizontal deflection coils 8 through which a horizontal deflection current flows to scan the electron beams in the horizontal direction, a pair of vertical deflection coils 9 through which a vertical deflection current flows to scan the electron beams in the vertical direction, and separators 10 between the horizontal and vertical deflection coils 8 and 9, as shown in FIG. 2. I the deflecting apparatus shown in FIG. 2, the vertical deflection coils 9 comprise a pair of upper and lower toroidal deflection coils. The vertical deflection coils 9 may comprise a pair of right and left saddle type deflection coils, as is known well.

In color cathode ray tube apparatuses of this type, an in-line type color cathode ray tube apparatus is widely used. In an in-line type color cathode ray tube apparatus, an in-line type electron gun assembly is incorporated, in which three electron guns are horizontally aligned in line to emit three electron beams consisting of a center beam and a pair of side beams. The in-line type color cathode ray tube apparatus employs a self convergence system to form an non-uniform magnetic field, in which horizontal and vertical deflection magnetic fields generated by the deflection yoke have a pin cushion shape and a barrel shape, respectively. The three electron beams are self-focused on the phosphor screen by this non-uniform magnetic field.

In this self convergence and in-line type color cathode ray tube apparatus, however, various types of screen distortions occur due to the characteristics of the tube and the tube assembly error. One of such screen distortions is a cross convergence error, in which deflection of the electron beams in the horizontal direction and a convergence error occur simultaneously. Due to the convergence error, cross convergence error patterns as shown in FIGS. 3A to 3D are displayed on the screen. Regarding correction of such a cross convergence error pattern, conventionally, Published Unexamined Japanese Patent Application Nos. 57-206184, 2-194791, and the like disclose a color cathode ray tube apparatus comprising a saturable reactor for differentially changing the current flowing through a pair of horizontal deflection coils in synchronism with a vertical deflection current to change the shape of the horizontal deflection magnetic field on a time-base manner, thereby correcting the convergence error.

Usually, the saturable reactor consists of a first impedance control coil connected to an upper one of a pair of upper and lower horizontal deflection coils and wound on a saturable core, a second impedance control coil connected to the lower horizontal deflection coil and wound on another saturable core, and saturation control coils connected to the vertical deflection coils. The direction of a magnetic field generated by the saturation control coil similarly wound on the saturable core on which one impedance control coil is wound is opposite to that of the magnetic field generated by one impedance control coil, and static magnetic fields are applied to these impedance control coils in advance.

The function of the saturable reactor will be described with reference to FIGS. 4A and 4C. Referring to FIG. 4A, an axis of abscissa H represents the strength of the magnetic field generated outside the saturable core, and an axis of ordinate L represents the inductance of the impedance control coils. Referring to FIG. 4A, solid and broken lines 12 and 13 represent the L-H characteristics of the two impedance control coils. Reference symbol $H_{mag}$ indicates a static magnetic field applied from the outside of the saturable cores; and $H_{vm}$, a magnetic field generated by the saturation control coils. A curve 12 indicated by the solid line and a curve 13 indicated by the broken line are symmetric with each other about the static magnetic field $H_{mag}$, because the magnetic fields generated by the saturation control coils and applied to the two impedance control coils are directed in opposite directions. When a vertical deflection current flows in the saturation control coils, the magnetic field $H_{vm}$ is generated, and the static magnetic field $H_{mag}$ and the magnetic field $H_{vm}$ are added so that inductances $L_u$ and $L_d$ of the impedance control coils are changed in synchronism with vertical deflection. FIG. 4B shows changes in inductances $L_u$ and $L_d$. Referring to FIG. 4B, the axis of ordinate represents the inductance, and the axis of abscissa represents a vertical deflection current. The correction amount for a cross convergence error by such a saturable reactor is almost proportional to the difference between the inductances $L_u$ and $L_d$ of the two impedance control coils. Thus, the correction amount plots the correction pattern indicated by a curve 16 shown in FIG. 4C.

Conventionally, a cross convergence error pattern of a color cathode ray tube apparatus has patterns represented in FIGS. 3E and 3F. In the recent years, however, as the panel of a color cathode ray tube is flatly formed, and complicated convergence and distortion correction mechanisms are added, a pattern in which the cross convergence error amount at each of the upper and lower end portions of the screen is smaller than that at each of the upper and lower intermediate portions of the screen, as shown in FIG. 3G, and a pattern in which the polarity of the cross convergence error at each of the upper and lower end portions of the screen is opposite to that at each of the upper and lower intermediate portions of the screen, as shown in FIG. 3H, are often formed.

In the conventional saturable reactor, since the correction amount is monotonously increased with respect to the vertical deflection current, although correction of the cross convergence error patterns as shown in FIGS. 3E and 3F is possible, it is difficult to correct the cross convergence error patterns as shown in FIGS. 3G and 3H. Hence, in the color cathode ray tube apparatus incorporating a conventional saturable reactor, a sufficient improvement in the image quality cannot be obtained.

Another screen distortion is a coma error which is generated since the deflection sensitivity for the center beam becomes relatively higher than that for a pair of side beams. More specifically, in the self convergence system in-line type color cathode ray tube apparatus, rasters 11B and 11R of the pair of side beams BB and BR can be set to coincide with each other throughout the entire area of the screen, as shown in FIG. 5, without requiring a correcting circuit means. However, due to the difference in deflection sensitivity between the center beam BG and the pair of side beams BB and BR, it is difficult to set a raster 11G of the center beam BG and the rasters 11B and 11R of the pair of side beams BB and RB to coincide with each other, and a coma error, i.e., horizontal and vertical direction coma errors HCR and VCR occur on each end of the horizontal axis (X axis) and each end of the vertical axis (Y axis), respectively, of the screen.

In the ordinary in-line type color cathode ray tube apparatus, this coma error can be corrected by disposing, to the electrode of the beam-emitting end portion of the electron gun assembly, a magnetic element called a field controller which has a function of relatively decreasing the deflection sensitivity for the pair of side beams to be lower than that for the center beam. When, however, a horizontal deflection frequency is changed to a high frequency, a convergence deviation is caused by the AC loss of the magnetic element. Therefore, many in-line type color cathode ray tube apparatuses correct the coma by the magnetic field of the deflection yoke itself without using a magnetic element. In this case, the coma error HCR can be corrected by the horizontal deflection coil itself as the deviation amount is small. However, it is difficult to correct the coma error VCR by the vertical deflection coil, as it has a large correction amount, and the coma error VCR remains uncorrected. Therefore, the coma error VCR is corrected by the following deflecting system. That is, auxiliary cores, obtained by winding coils respectively on a pair of U-shaped cores and connecting these coils to vertical deflection coils in series, are disposed at a side end portion (rear end portion) of the electron gun assembly of the deflection yoke to be vertically symmetric about the horizontal axis, and a pin cushion shape magnetic field is generated to correspond to the barrel vertical deflection magnetic field for vertical deflection. A means for controlling the operation of the auxiliary coils by diodes in order to efficiently correct the coma VCR throughout the entire area of the screen is shown in, e.g., Published Unexamined Japanese Patent Application No. 63-225462 (U.S. Pat. No. 4,818,919).

When the screen distortion is increased from the central portion of the screen toward the upper and lower end portions of the screen, as described above, it can be corrected to a certain degree. However, when the screen distortion at each of the upper and lower intermediate portions of the screen is larger than the screen distortion at each of the upper and lower end portions of the screen, sufficient correction cannot be performed.

Published Unexamined Japanese Patent Application Nos. 63-195935, 1-175150, and 1-183042 describe a means for forming a saturation control coil with two coils and controlling one coil by a diode. With this means, although cross convergence errors having patterns as shown in FIGS. 3E and 3F can be corrected, cross convergence errors having patterns as shown in FIGS. 3G and 3H cannot be corrected.

SUMMARY OF THE INVENTION

It is an object of the present invention to provide a deflecting apparatus for a color cathode ray tube, which can effectively correct screen distortions at upper and lower intermediate portions and upper and lower end portions of a screen and which has a high degree of design flexibility for a correction amount, and a color cathode ray tube apparatus.

According to the present invention, there is provided an apparatus for deflecting electron beams in accordance with first and second deflection currents comprising:

a pair of first deflection coils, energized by the first deflection currents, for generating a first magnetic field to deflect the electron beams in a first direction;

at least one second deflection coil, energized by the second deflection current, for generating a second magnetic field to deflect the electron beams in a second direction;

first and second impedance control coils connected to first deflection coils and having first and second impedances, respectively;

a saturable core on which the impedance control coils are wound;

a first saturation control coil, supplied with the second deflection current and magnetically coupled with the first and second impedance control coils, for generating a first control magnetic field having a polarity and changing the first and second impedance of the first and second impedance control coils to restrict the level of the first deflection current flowing through the first deflection coils;

a second saturation control coil, connected in parallel with said first saturation control coil and magnetically coupled with the first and second impedance control coils, for generating a second control magnetic field having an opposite polarity to that of the first control magnetic field and changing the first and second impedance of the first and second impedance control coils to restrict the level of the first deflection current flowing through the first deflection coils; and a parallel diode circuit connected in series with the second saturation control coil and including a pair of parallel-connected diodes having opposite directions.

According to the present invention, there is also provided a deflecting apparatus for a color cathode ray tube, wherein at least a resistor is connected in series with the first saturation control coil to constitute a first deflection current system, and a second deflection current system constituted by the second saturation control coil and a pair of diodes having opposite polarities is connected in parallel with the first deflection current system, so that the deflection current flowing through the second deflection coils can be shunted into the first and second deflection current systems, and that generation of magnetic fields having opposite polarities can be controlled by the diodes.

According to the present invention, there is also provided a deflecting apparatus for a color cathode ray tube, comprising, in addition to the arrangement described above, two pairs of sub coils for generating auxiliary magnetic fields in synchronism with the current flowing through the second deflection coils, wherein one of the two pairs of sub coils are connected to the second deflection current system.

According to the present invention, there is also provided a color cathode ray tube apparatus comprising:

first signal generating means for generating a first deflection signal;

second signal generating means for generating a second deflection signal;

an in-line type electron gun assembly for generating a center beam and a pair of side beams that are aligned in line in a first direction;

a pair of first deflection coils, energized by the first deflection currents, for generating a first magnetic field to deflect the electron beams in a first direction;

at least one second deflection coil, energized by the second deflection current, for generating a second magnetic field to deflect the electron beams in a second direction;

first and second impedance control coils connected to first deflection coils and having first and second impedances, respectively;

a saturable core on which the impedance control coils are wound;

a first saturation control coil, supplied with the second deflection current and magnetically coupled with the first and second impedance control coils, for generating a first control magnetic field having a polarity and changing the first and second impedance of the first and second impedance control coils to restrict the level of the first deflection current flowing through the first deflection coils;

a second saturation control coil, connected in parallel with said first saturation control coil and magnetically coupled with the first and second impedance control coils, for generating a second control magnetic field having an opposite polarity to that of the first control magnetic field and changing the first and second impedance of the first and second impedance control coils to restrict the level of the first deflection current flowing through the first deflection coils; and a parallel diode circuit connected in series with the second saturation control coil and including a pair of parallel-connected diodes having opposite directions.

According to the present invention, there is also provided a color cathode ray tube apparatus, wherein at least a resistor is connected in series with the first saturation control coil to constitute a first deflection current system, and a second deflection current system constituted by the second saturation control coil and a pair of diodes having opposite polarities is connected in parallel with the first deflection current system, so that the deflection current flowing through the second deflection coils can be shunted into the first and second deflection current systems, and that generation of magnetic fields having opposite polarities can be controlled by the diodes.

According to the present invention, there is also provided a color cathode ray tube apparatus, comprising, in addition to the arrangement described above, two pairs of sub coils for generating auxiliary magnetic fields in synchronism with the current flowing through the second deflection coils, wherein one of the two pairs of sub coils are connected to the second deflection current system.

The deflecting apparatus according to the present invention basically corrects, of the screen distortions, the cross convergence errors of a pair of side beams. The inductances of the impedance control coils connected to a pair of first deflection coils that deflect the electron beams in a direction along which they are aligned are changed by the magnetic field generated by the saturation control coils, through which the deflection current flowing through the second deflection coils flows, in synchronism with the deflection in the second direction, so as to generate a differential current between the pair of first deflection coils, thereby correcting the cross convergence error.

At this time, the saturation control coils are constituted by the first and second saturation control coils. At least a resistor is connected in series with the fist saturation control coil to constitute the first deflection current system. The second deflection current system constituted by the second saturation control coil and a pair of diodes having opposite polarities is connected in parallel with the first deflection current system, thereby forming a shunt path of the deflection currents. Therefore, before the diodes are turned on, the deflection current flows through the first deflection current system, and no current flows through the second deflection current system. When the diodes are turned on, the deflection current is shunted to the second deflection current system. At this time, since the first and second deflection current systems are connected in parallel with each other, when the diodes are turned on, the deflection current is shunted to the second deflection current, and the current that has been flowing through the first deflection current system no longer increases. Since the second saturation control coil generates a magnetic field having a polarity opposite to that of the magnetic field generated by the first saturation control coil, a magnetic field opposite to the magnetic field generated by the first saturation control coil is also applied to the saturable core on which the impedance control coils of the saturable reactor are wound. That is, up to the upper and lower intermediate portions of the screen, the saturable reactor is operated by the first saturation control coil. When the diodes are turned on, the amount of the entire magnetic field as the whole saturation control coils is adjusted by the shunt ratio of the first to second deflection current systems and the magnetic field generated by the second saturation control coil itself.

As a result, the correction pattern of a required cross convergence error can be obtained by appropriately setting the amount of magnetic field which is generated by the saturation control coils in synchronism with the deflection current.

Furthermore, according to the present invention, a coma error VCR caused between the center beam and the side beams in the upper and lower sides of the screen can also be corrected simultaneously based on the following principle.

More specifically, correction of the coma error VCR is performed by two pairs of sub coils for generating auxiliary magnetic fields in synchronism with the current flowing through the second deflection coil, which is generates a deflection magnetic field that deflects the electron beams in the second direction perpendicular to the first direction. Correction of the cross convergence error caused by the pair of side beams is performed by changing the inductances of the pair of impedance control coils connected to the pair of first deflection coils, which deflect the electron beams in the direction along which they are aligned, by the magnetic field generated by the saturation control coils through which the deflection current flowing through the second deflection coil flows in synchronism with deflection in the second direction, so that a differential current is generated between the pair of first deflection coils.

At this time, according to the present invention, the saturation control coils are constituted by the first and second saturation control coils. One of the two pairs of sub coils constitute the second deflection current system together with the diodes connected to the second saturation control coil to have opposite polarities. The first deflection current system constituted by the first saturation control coil and the resistor is connected in parallel with the second deflection current system. Hence, substantially no current flows to the second deflection current system until the diodes are turned on. Thus, the correction amount of the coma error VCR can be freely set by controlling one of the two pairs of sub coils by the diodes in synchronism with deflection in a direction perpendicular to the direction along which the electron beams are aligned. Since the first and second deflection current systems are connected in parallel with each other, when the diodes are turned on, the deflection current is shunted to the second deflection current system, and the current flowing through the first deflection current system no longer increases. Since the second saturation control coil is so wound as to generate a magnetic field having an opposite direction to that of the magnetic field generated by the first saturation control coil, when the diodes are turned on, the impedance control coils generate a magnetic field having an opposite polarity to that of the magnetic field generated by the first saturation control coil. Accordingly, the entire magnetic field generated by the saturation control coils as a whole of the saturable reactor is controlled by the turn-on operation of the diodes, so that the correction amount of the cross convergence error is also changed as the magnetic field is changed.

In this manner, both the coma error VCR and the cross convergence error are corrected simultaneously in synchronism with deflection, thereby obtaining a desired correction pattern.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

The preferred embodiments of the present invention will be described with reference to the accompanying drawings.

Embodiment 1

Figure 6:
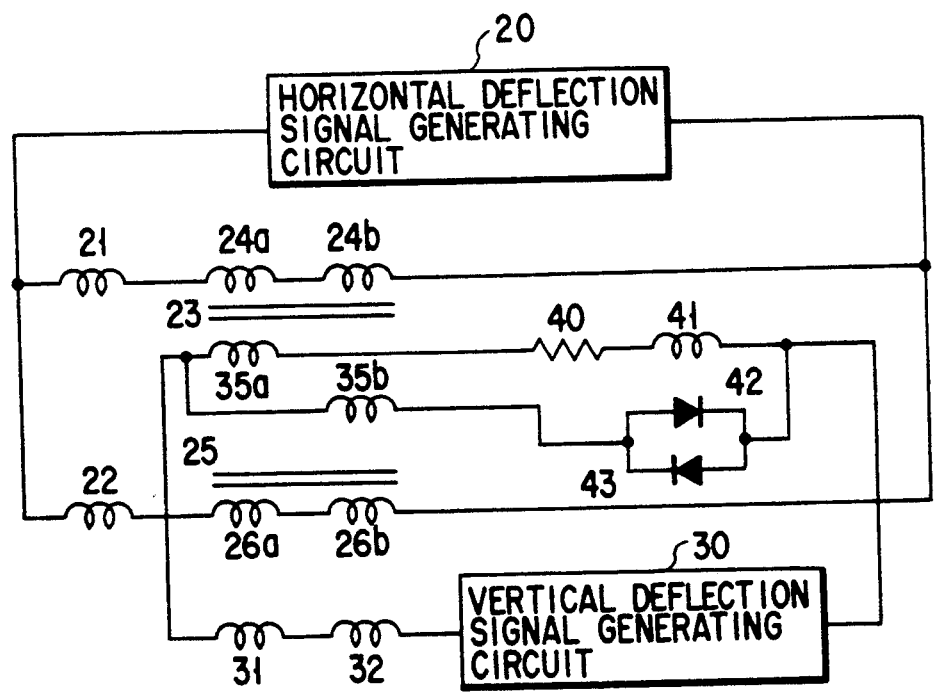
FIG. 6 is a block diagram showing the circuit configuration of a deflecting apparatus according to an embodiment of the present invention.

FIG. 6 shows a saturable reactor circuit incorporated in a color cathode ray tube apparatus according to an embodiment of the present invention. As shown in FIG. 6, a horizontal deflection signal generating circuit 20 is connected to one end of each of a pair of upper and lower horizontal deflection coils 21 and 22, and impedance control coils 24a and 24b wound on a saturable core 23 are connected in series between the other end of the horizontal deflection coil 21 disposed in the upper side of the tube and the horizontal deflection signal generating circuit 20. Similarly, the horizontal deflection signal generating circuit 20 is connected to one end of the horizontal deflection coil 22 disposed in the lower side of the tube, and impedance control coils 26a and 26b wound on a saturable core 25 are connected in series between the horizontal deflection signal generating circuit 20 and the other end of the horizontal deflection coil 22 disposed in the lower side of the tube. Vertical deflection coils 31 and 32 are connected in series with a vertical deflection signal generating circuit 30, and both of two saturation control coils 35a and 35b are connected in series with the series circuit of the vertical deflection coils 31 and 32. The saturation control coils 35a and 35b are magneticaly coupled to the impedance control coils 24a, 24b, 26a and 26b. Accordingly, the impedance control coils 24a, 24b, 26a, and 26b, together with the saturation control coils 35a and 35b, constitute a saturable reactor for differentially changing the current flowing through the pair of horizontal deflection coils 21 and 22 in synchronism with the vertical deflection current.

The saturable reactor differentially changes the horizontal deflection current having a high frequency in synchronism with the vertical deflection current having a relatively low frequency, as described above. Static magnetic fields are applied from magnets (not shown) to the impedance control coils 24a, 24b, 26a, and 26b. Furthermore, the two saturation control coils 35a and 35b have opposite polarities, that is, the magnetic field generated by the first saturation control coil 35a has an opposite polarity to that of the magnetic field generated by the second saturation control coil 35b. To obtain magnetic fields having opposite polarities, for example, the second saturation control coil 35b may be wound coaxially with and in the opposite direction to the first saturation control coil 35a.

The total magnetic field from the saturation coils 35a and 35b has a same polarity to that of the static magnetic field of the one of the magnets and an opposite polarity to that of the static magnetic field of the other of the magnets.

A resistor 40 and a choke coil 41 are connected to the first saturation control coil 35a to form a first deflection current system, and a pair of parallel-connected diodes 42 and 43 having opposite polarities are connected to the second saturation control coil 35b to form a second deflection current system. The first and second deflection current systems are connected in parallel with each other to constitute a circuit for shunting the vertical deflection current.

The operation and function of the saturable reactor of this embodiment will be described.

Figure 7:
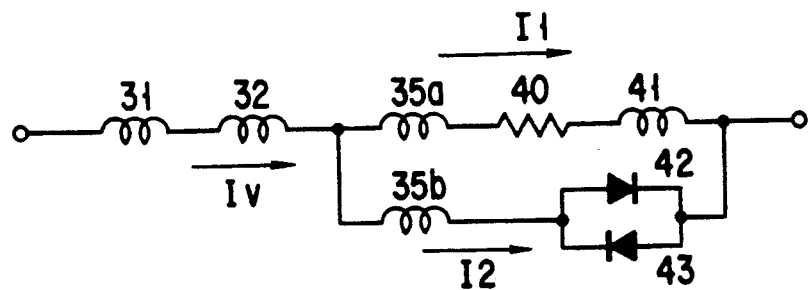
FIG. 7 is a block diagram showing a circuit connected to a vertical deflection signal generating circuit of the circuit shown in FIG. 6.

FIG. 7 shows the configuration of the series circuit connected to the vertical deflection signal generating circuit 30 of FIG. 6. In the deflecting apparatus having a saturable reactor according to this embodiment, a vertical deflection current $I_v$ flowing through the vertical deflection coils 31 and 32 is shunted into a current $I_1$ flowing through the first deflection current system and a current $I_2$ flowing through the second deflection current system, and the current $I_2$ flowing through the second deflection current system is controlled by the pair of diodes 42 and 43.

Figure 8A:
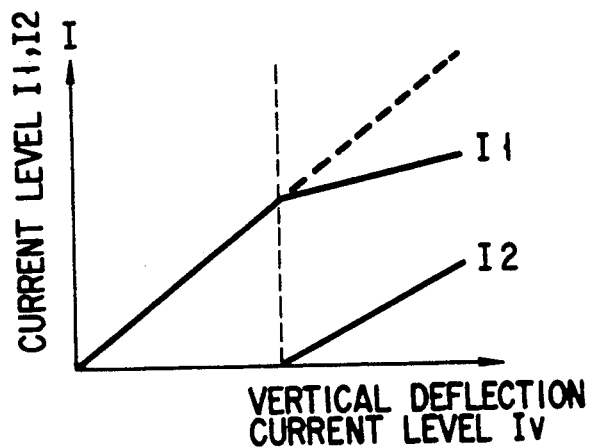
FIGS. 8A and 8B are graphs showing the relationships between a deflection current and a shunted current and between a deflection current and a magnetic flux, respectively, of the circuit shown in FIG. 7.
Figure 8B:
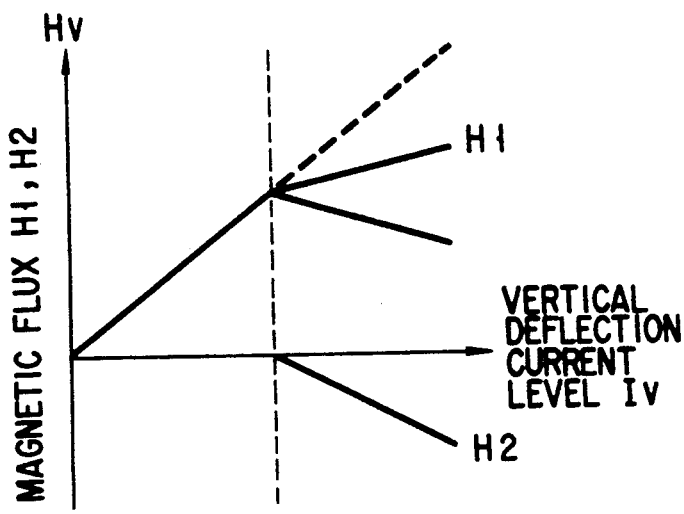

The relationship between the vertical deflection current $I_v$ and the correction amount will be described with reference to FIGS. 8A and 8B. FIG. 8A shows the relationship between the vertical deflection current $I_v$ and the currents $I_1$ and $I_2$ flowing through the first and second deflection current systems. The current $I_2$ does not flow until either the diode 42 or 43 is turned on, and the current $I_2$ is rapidly increased after the pair of diodes 42 and 43 are turned on. At this time, since the first and second deflection current systems are connected in parallel with each other, when the current $I_2$ is shunted to the second deflection system, as the vertical deflection current $I_v$ is increased, the current $I_1$ flowing through the first deflection current system is not linearly increased, as indicated by a broken line, but is gradually decreased as indicated by a solid line. The second saturation control coil 35b in the second deflection current system generates a magnetic field having an opposite polarity to that of the magnetic field generated by the first saturation control coil 35a. Accordingly, after either the diode 42 or 43 is turned on, a magnetic field $H_2$ generated by the second saturation control coil 35b is rapidly increased, as shown in FIG. 8B. At this time, since the current $I_1$ flowing through the first deflection current system is decreased, as the vertical deflection current $I_v$ is increased, the magnetic field $H_1$ generated by the first saturation control coil 35a is not increased linearly, as indicated by the broken line, but an increase in a magnetic field $H_1$ is declined. As a result, the magnetic field as the saturation control coil as a whole is decreased compared to that obtained by only the first saturation control coil 35a before the diode 42 or 43 is turned on, and the external magnetic field applied to the impedance control coils 24a, 24b, 26a and 26b is decreased. That is, the magnetic field obtained by the saturation control coils 35a and 35b becomes maximum at the intermediate portion of the screen where the diode 42 or 43 is turned on. The saturable reactor controls the horizontal deflection current by changing the inductances of the impedance control coils 24a, 24b, 26a and 26b by the magnetic fields generated by the saturation control coils 35a and 35b, as described above. Thus, the correction amount of the cross convergence error can be changed between the central portion and the upper and lower end portions of the screen by controlling the magnetic fields generated by the saturation control coils 35a and 35b.

Figure 3E:
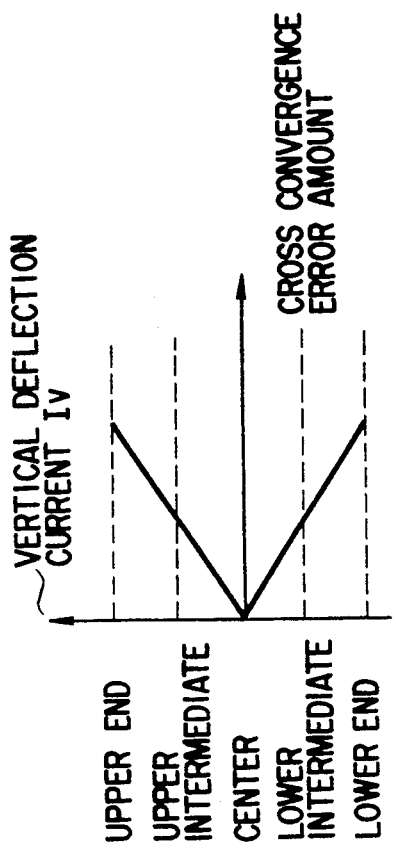
FIGS. 3A to 3D and 3E to 3H are views for explaining cross convergence errors of a pair of side beams that appear on the screen of the conventional color cathode ray tube apparatus.
Figure 3F:
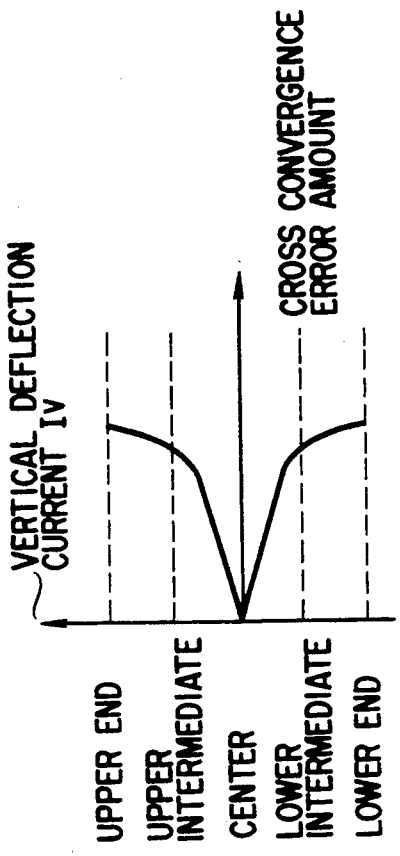
Figure 3A:
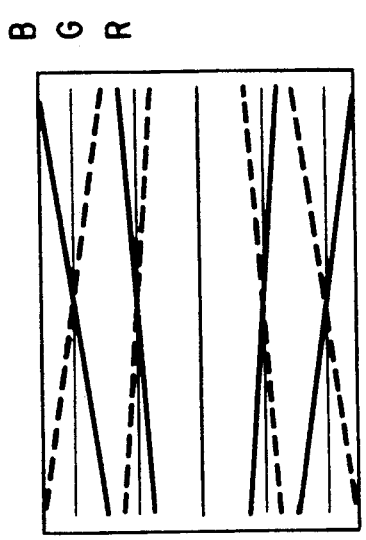
Figure 3B:
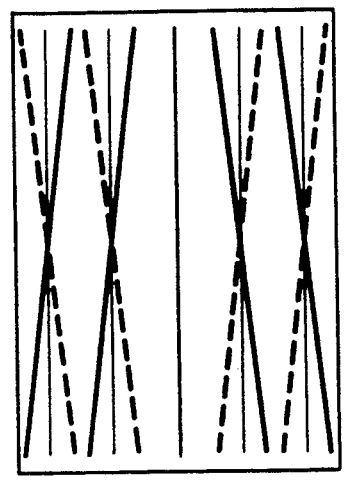
Figure 3G:
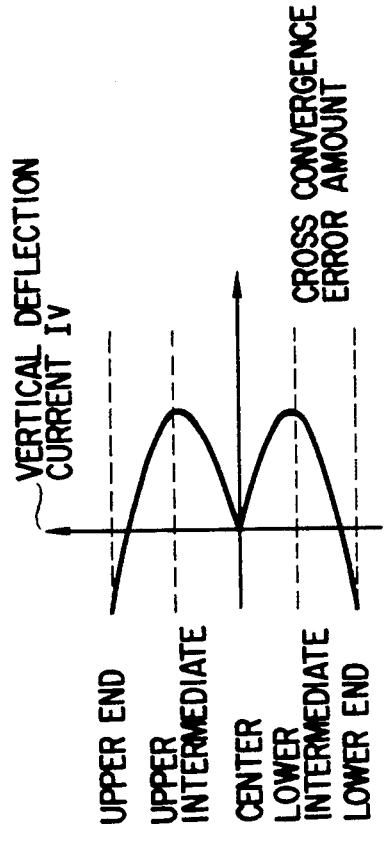
Figure 3H:
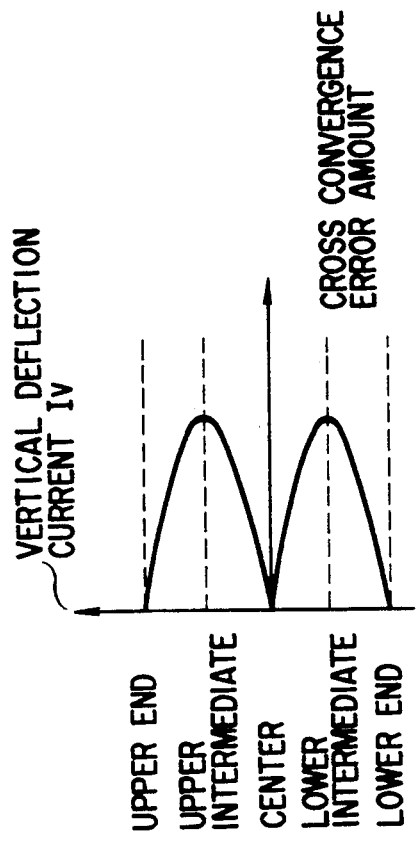
Figure 3C:
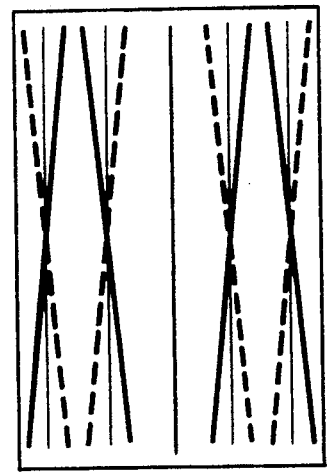
Figure 3D:
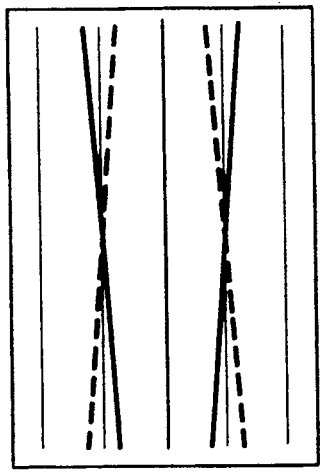
Figure 4A:
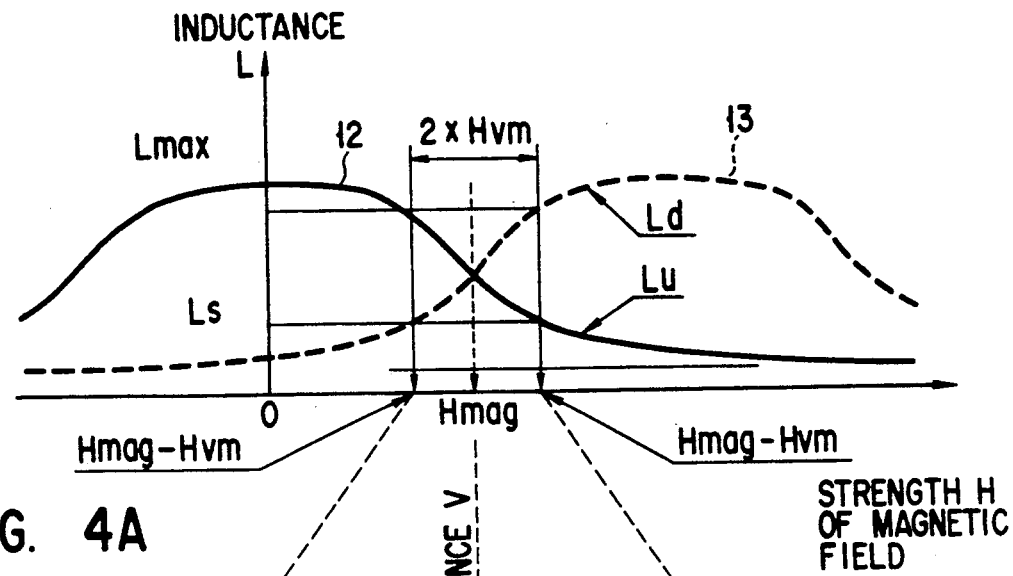
FIGS. 4A to 4C are views for explaining the operation principle of a saturable reactor used in the conventional deflecting apparatus or color cathode ray tube apparatus.
Figure 4B:
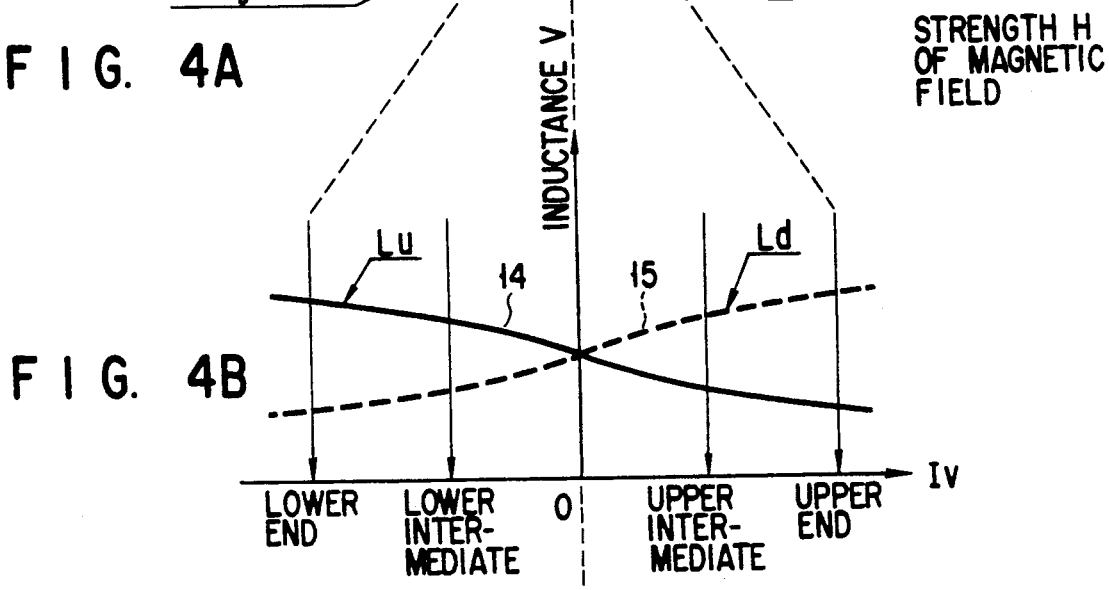
Figure 4C:
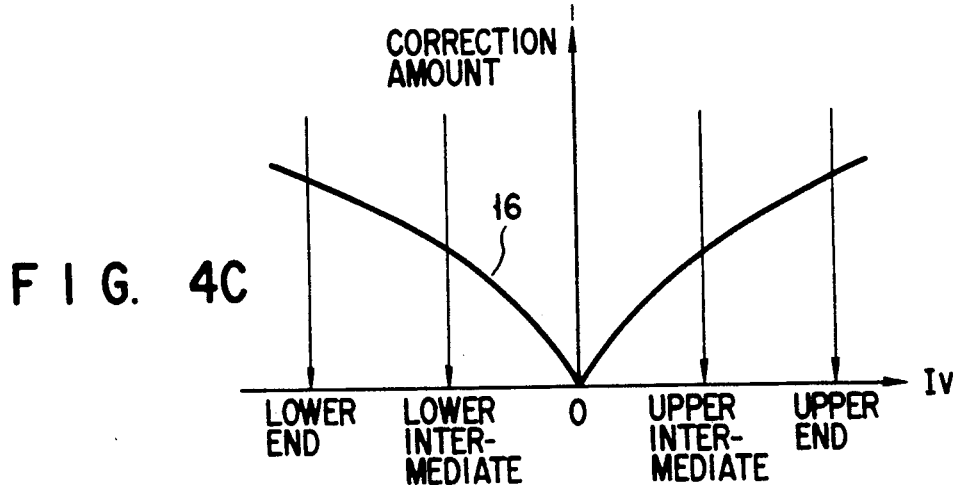
Figure 5:
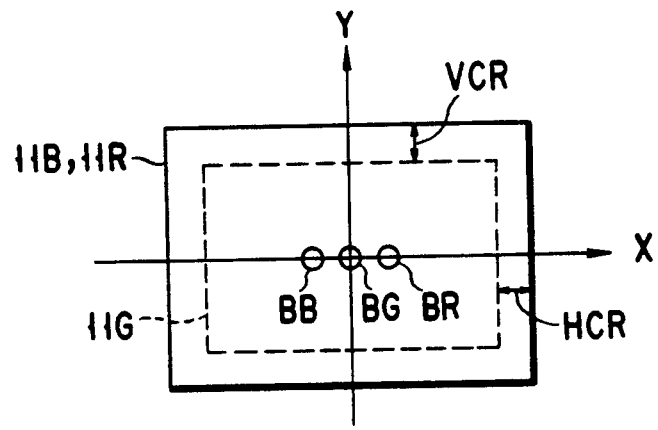
FIG. 5 shows a coma error appearing on the screen of the conventional color cathode ray tube apparatus.

Various types of correction patterns can be formed by adjusting the magnetic fields generated b the first and second saturation control coils 35a and 35b and the turn-on points of the diodes 42 and 43, and any cross convergence error can be accurately corrected by appropriately selecting a correction pattern. More specifically, when the curve of the correction amount has a gradient as shown in FIG. 3C, the gradient of curve of correction amount can be adjusted by the amplitude of the magnetic field generated by the first saturation control coil 35a, the position on the screen where the maximum correction amount is obtained can be adjusted by the current level that turns on the diode 42 or 43, in other words, the maximum correction amount can be adjusted by the position on the screen to which the beam is directed by vertical deflection, and the gradient of the curve of the correction amount after the diode 42 or 43 is turned on can be adjusted by a shunt ratio $I_1/I_2$ of the first and second deflection current systems or the strength of the magnetic field generated by the second saturation control coil 35b. The magnetic field can be adjusted by changing the shunt ratio of the first and second deflection current systems and the number of turns of each saturation control coil.

In the circuit shown in FIG. 7, the choke coil 41 is arranged in the circuit. The choke coil 41 adjusts the induced electromotive force generated in a closed circuit constituted by the first and second deflection current systems. That is, the sum of the induced electromotive forces generated by coils in other closed circuits is adjusted by the induced electromotive force generated by the choke coil 41, thereby relaxing the transitional induced electromotive force at start of scanning.

In this embodiment, the configuration of the saturable reactor, especially the configuration of the the impedance coils connected to horizontal deflection signal generating circuit 20, is not described in detail. However, any type of conventional saturation reactor can be utilized as far as its saturation control coils connected to the vertical deflection coils have arrangements as shown in this embodiment.

In FIGS. 6 and 7, the saturation control coils 35a and 35b are connected to the vertical deflection coils 31 and 32. However, the saturation control coils may not be connected to the vertical deflection coils to directly flow the vertical deflection current.

As described above, according to this embodiment, the various types of deviation patterns of the cross convergence errors can be corrected by dividing the saturation control coils of the saturable reactor into a coil of the forward direction and a coil of the reverse direction, connecting these saturation control coils in parallel with each other, and controlling the saturation control coils by diodes. Circuit design for this purpose can be easily performed.

Embodiment 2

The deflecting apparatus for a color cathode ray tube described in Embodiment 1 is incorporated in a color cathode ray tube apparatus as follows.

Figure 1:
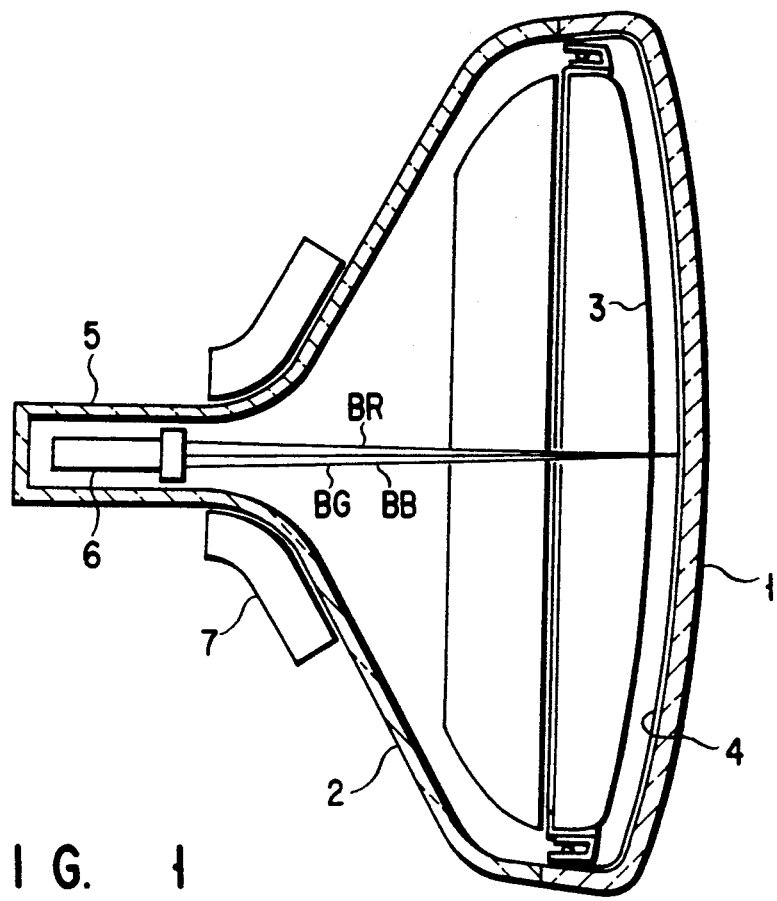
FIG. 1 is a sectional view showing the structure of a conventional color cathode ray tube apparatus.

The color cathode ray tube apparatus has a general structure as shown in FIG. 1 and has an envelope consisting of a panel 1 and a funnel 2 that are integrally bonded. A shadow mask 3 having a large number of electron beam holes formed therein is mounted on the inner side of the panel 1. A phosphor screen 4 having three color phosphor layers that emit blue light, green light, and red light upon landing of the electron beams is formed on the inner surface of the panel 1 to oppose the shadow mask 3. An electron gun assembly 6 is disposed in a neck 5 of the funnel 2. Three electron beams BR, BG, and BB emitted by the electron gun assembly 6 are deflected by the magnetic field generated by a deflection yoke 7 mounted on the outer side of the funnel 2. The phosphor screen 4 is scanned in the horizontal and vertical directions by the three deflected electron beams BR, BG, and BB, to display a color image on the phosphor screen 4.

Figure 2:
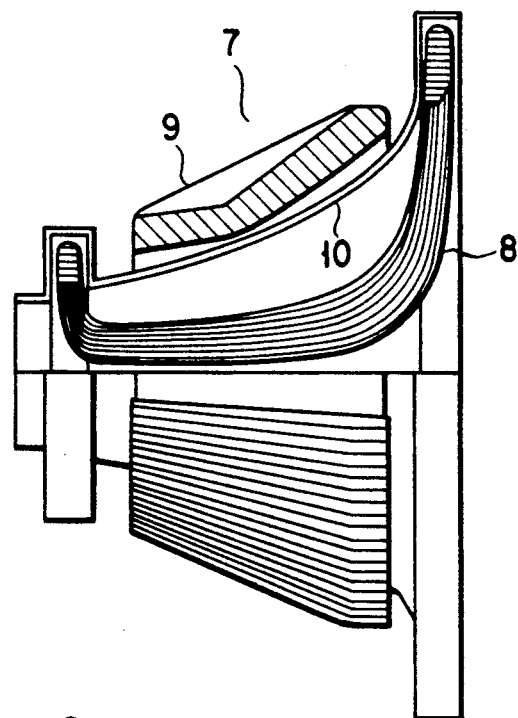
FIG. 2 is a schematic view showing the structure of a deflecting apparatus shown in FIG. 1.

As described above, the deflection yoke 7 for deflecting the electron beams BR, BG, and BB is constituted by a pair of saddle type horizontal deflection coils 8 through which a horizontal deflection current flows to scan the electron beams in the horizontal direction, a pair of vertical deflection coils 9 through which a vertical deflection current flows to scan the electron beams in the vertical direction, and separators 10 between the horizontal and vertical deflection coils 8 and 9, as shown in FIG. 2. In FIG. 2, the vertical deflection coils 9 comprise a pair of upper and lower toroidal type deflection coils. However, the vertical deflection coils 9 may comprise a pair of right and left saddle type deflection coils. Generally, the electron guns are horizontally aligned in line to form in-line type electron guns for emitting three electron beams consisting of a center beam and a pair of side beams. Horizontal and vertical deflection magnetic fields generated by the deflection yoke have a pin cushion shape and a barrel shape, respectively, to constitute an non-uniform magnetic field. The three electron beams are self-converged on the phosphor screen by this non-uniform magnetic field. Namely, the in-line type color cathode ray tube apparatus employs the self convergence system.

The deflecting apparatus of this embodiment has a circuit as shown in FIG. 6. In the embodiment shown in FIG. 6, the second deflection current system constituted by a second saturation control coil 35b and a pair of diodes 42 and 43 is connected in parallel with the first deflection current system including a first saturation control coil 35a. This aims at shunting the current flowing through the first saturation control coil 35a to the diodes 42 and 43 to decline its increase, and to generate in the second saturation control coil 35b a magnetic field of the opposite direction to that generated by the first saturation control coil 35a, thereby effectively performing magnetic field inversion.

Embodiment 3

In some color cathode ray tube apparatus, in addition to a cross convergence error, a coma error VCR appears simultaneously. An embodiment for solving this problem will be described.

Figure 9:
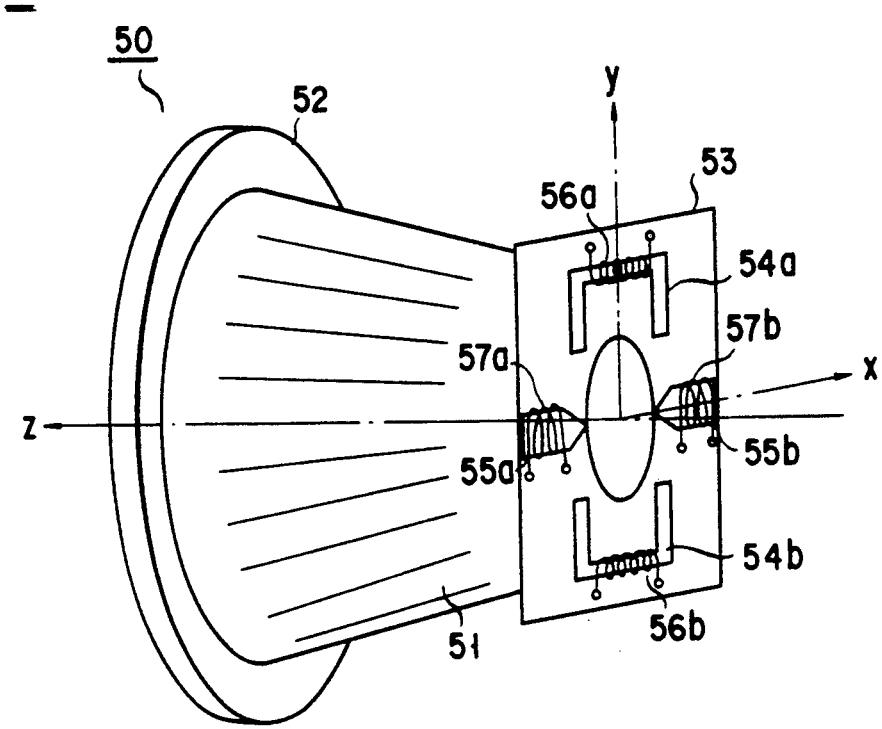
FIG. 9 is a schematic perspective view showing a deflecting apparatus according to another embodiment of the present invention.

FIG. 9 is a perspective view showing a deflecting apparatus for a color cathode ray tube according to still another embodiment of the present invention. A deflecting apparatus 50 is mainly constituted by first deflection coils (not shown in FIG. 9) for deflecting the electron beams aligned in line in their aligning direction, second deflection coils 51 for deflecting the electron beams in a direction perpendicular to the aligning direction of the beams, separators 52 located between these deflection coils, and two pairs of sub coils 54a and 54b, and 55a and 55b disposed at an electron gun-side rear end portion 53 of the separators 52. The sub coils 54a and 54b are respectively wound on a pair of U-shaped cores 56a and 56b disposed to be substantially symmetric about the aligning axis (X-axis) of the electron beams, and the sub coils 55a and 55b are respectively wound on a pair of rod-like cores 57a and 57b disposed on the aligning axis (X-axis) of the electron beams. Although not shown in FIG. 9, the first and second deflection coils are connected to a saturable reactor that differentially changes the output current in synchronism with the input current by utilizing a change in inductance caused by the magnetic field. Usually, the electron beams are horizontally aligned in line, the first deflection coils correspond to the horizontal deflection coils 8 shown in FIG. 2, and the second deflection coils correspond to the vertical deflection coils 9 shown in FIG. 2.

Figure 10:
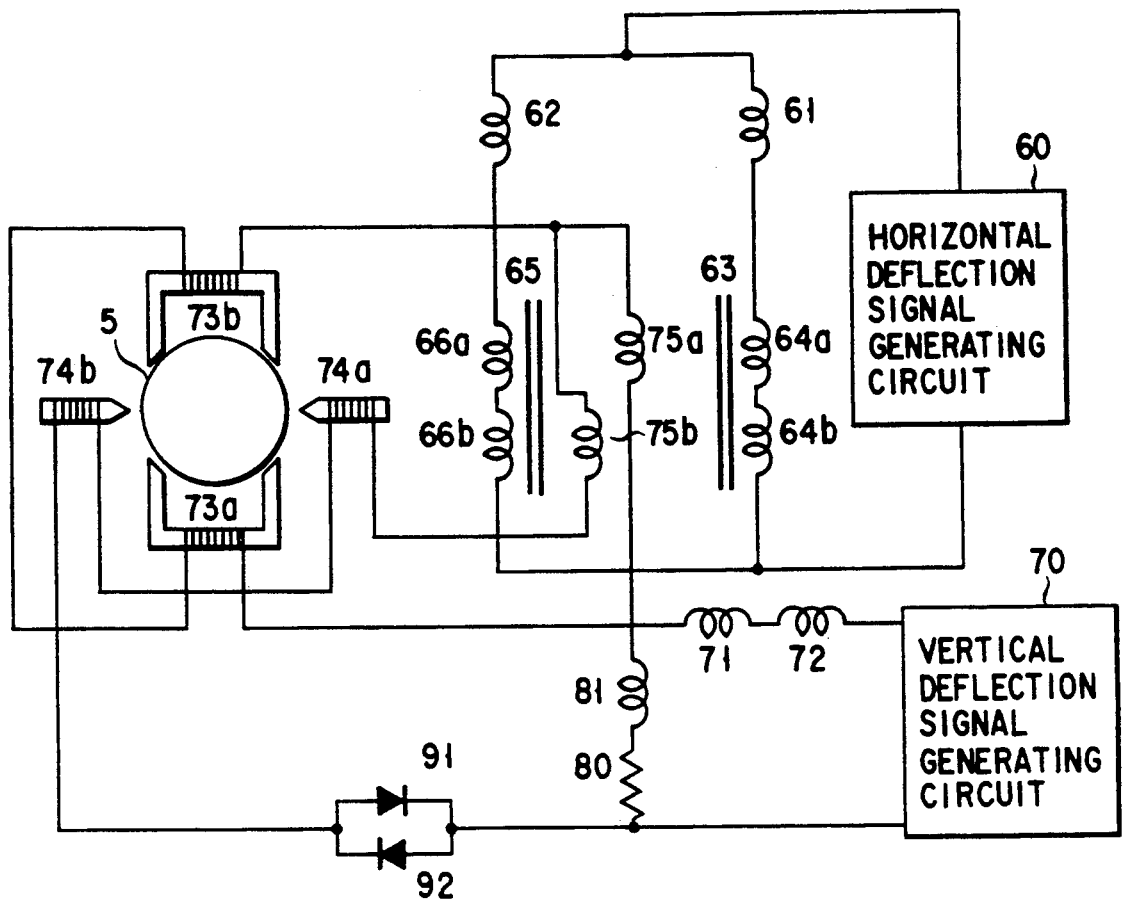
FIG. 10 is a block diagram showing a circuit of the deflecting apparatus shown in FIG. 9.

The circuit configuration of the deflecting apparatus shown in FIG. 9 will be described with reference to FIG. 10. As shown in FIG. 10, a horizontal deflection signal generating circuit 60 is connected to one end of each of a pair of upper and lower horizontal deflection coils 61 and 62, and impedance control coils 64a and 64b wound on a saturable core 63 are connected in series between the other end of the upper horizontal deflection coil 61 and the horizontal deflection signal generating circuit 60. Impedance control coils 66a and 66b wound on a saturable core 65 are connected in series between the other end of the lower horizontal deflection coil 62 and the horizontal deflection signal generating circuit 60. Furthermore, a vertical defection signal generating circuit 70 is connected in series with vertical deflection coils 71 and 72, the series circuit of the vertical deflection coils 71 and 72 is connected in series with first sub coils 73a and 73b, the series circuit of the first sub coils 73a and 73b is connected in series with second sub coils 74a and 74b. Saturation control coil 75a is connected in series with the series circuit of the first sub coils 73a and 73b and saturation control coil 75b is connected in series with the series circuit of the second sub coils 74a and 74b and saturation control coils 75a and 75b is in a parallel relation. The impedance control coils 64a and 64b are wound on the saturable core 63, and the impedance control coils 66a and 66b are wound on the saturable core 65. The saturation control coils 75a and 75b are magnetically coupled to the impedance control coil 64a, 64b, 66a, and 66b. Accordingly, the impedance control coils 64a, 64b, 66a, and 66b, together with the saturation control coils 75a and 75b, constitute a saturable reactor for differentially changing the current flowing through the pair of horizontal deflection coils 61 and 62 in synchronism with the vertical deflection current.

The saturable reactor differentially changes the horizontal deflection current in synchronism with the vertical deflection current, as described above. The total magnetic field from the saturation coil 75a and 75b has the same polarity as the static magnetic field of one of the magnets and an opposite polarity to the static magnetic field of the other of the magnets. Static magnetic fields are applied by magnets (not shown) in advance to the saturable cores 63 and 65 on which the impedance control coils 64a and 64b, and 66a and 66b are wound. Furthermore, the two saturation control coils 75a and 75b have opposite polarities, that is, the magnetic field generated by the first saturation control coil 75a has an opposite polarity to that of the magnetic field generated by the second saturation control coil 75b. To obtain magnetic fields having opposite polarities, for example, the second saturation control coil 75b may be wound coaxially with and in the opposite direction to the first saturation control coil 75a.

A resistor 80 and a choke coil 81 are connected in series with the first saturation control coil 75a to form a first deflection current system DC1, and a pair of parallel-connected diodes 91 and 9 having opposite polarities are connected in series with the series circuit of the second sub coils 74a and 74b and the second saturation control coil 75b to form a second deflection current system DC2. The second deflection current system is connected in parallel with the first deflection current system.

The operation and function of the circuit shown in FIG. 10 will be described.

Figure 11:
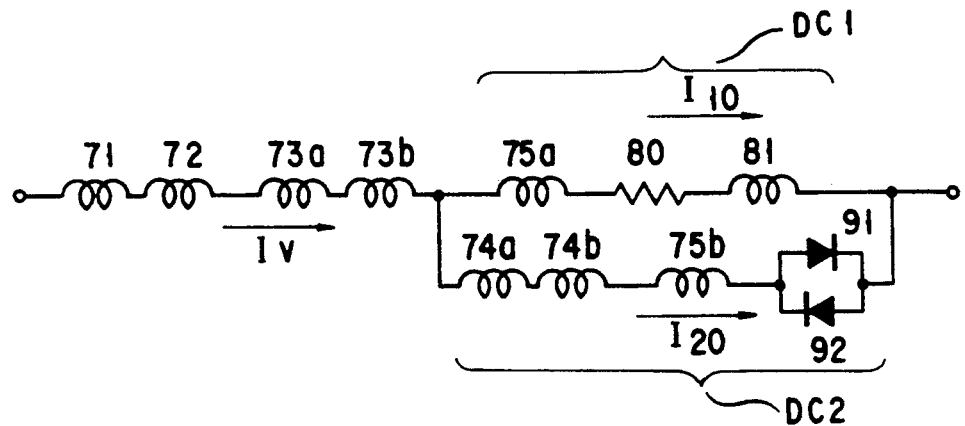
FIG. 11 is a block diagram showing a circuit connected to a vertical deflection signal generating circuit of the circuit shown in FIG. 10.

FIG. 11 shows the configuration of the series circuit connected to the vertical defection signal generating circuit 70 of FIG. 10. In the circuits shown in FIGS. 10 and 11, the deflecting apparatus mainly has a saturable reactor and sub coils. A vertical deflection current $I_v$ flowing through the vertical deflection coils 71 and 72 and a pair of sub coils 73a and 73b, of the two pairs of sub coils, is shunted into a current $I_{10}$ flowing through the first deflection current system DC1 constituted by the series circuit of the first saturation control coil 75a and the resistor 80, and a current $I_{20}$ flowing through the second deflection current system DC2 constituted by the other pair of sub coils 74a and 74b, of the two pairs of sub coils, the second saturation control coil 75b, and the pair of diodes 91 and 92 having opposite polarities. The current flowing through the second deflection current system DC2 is controlled by the diodes 91 and 92.

Figure 12A:
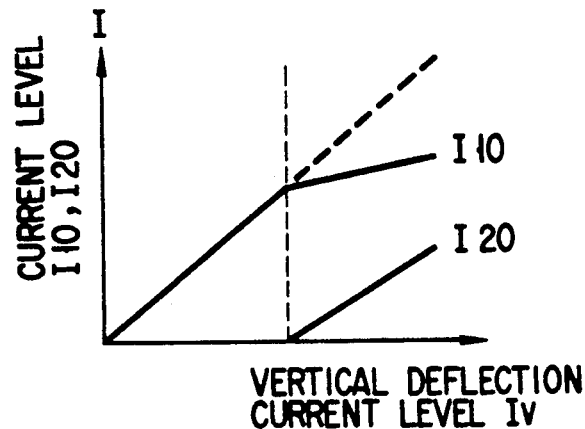
FIGS. 12A, 12B, and 12C are graphs showing the relationships between the deflection current and the shunted current, between the deflection current and the correction amount of the coma error VCR, and between the deflection current and the magnetic flux, respectively, of the circuit shown in FIG. 11.
Figure 12B:
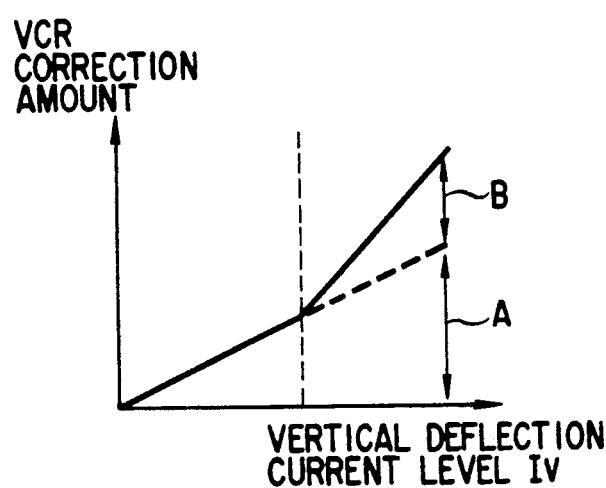
Figure 12C:
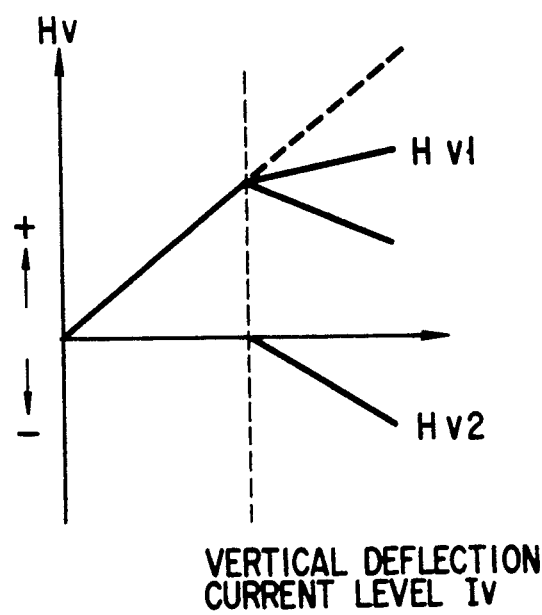

The relationship between the vertical deflection current and the correction amount will be described with reference to FIGS. 12A, 12B, and 12C. FIG. 12A shows the relationship between the vertical deflection current $I_v$ and the currents $I_{10}$ and $I_{20}$ flowing through the first and second deflection current systems DC1 and DC2. The current $I_{20}$ does not flow until either the diode 91 or 92 is turned on, and the current $I_{20}$ is rapidly increased after the pair of diodes 91 and 92 are turned on. Of the two pairs of sub coils, one pair of sub coils 74a and 74b are connected to the second deflection current system DC2. Accordingly, when the diodes 91 and 92 are turned on, a correction B obtained by the sub coils 74a and 74b is added to the correction amount A obtained by the sub coil 73a and 73b, as shown in FIG. 12B. As a result, a coma error VCR in which the deviation amount is increased toward the upper end of the screen can be corrected. That is, the vertical deflection current $I_v$ is flowed to the first deflection current system DC1 up to the turn-on point of the diode, e.g., up to the intermediate portion of the screen. Accordingly, only a VCR correction A is applied to the electron beams by the pin-cushion magnetic fields generated by the sub coils 73a and 73b wound on a pair of U-shaped cores. The VCR correcting function by means of the pin-cushion magnetic fields is based on the same principle as that of the conventional correction. In the intermediate portion toward the upper and lower end portions of the screen, when the diodes are turned on and the deflection current is shunted also to the second deflection current system DC2, the correction B obtained by the barrel magnetic fields generated by the second sub coils 74a and 74b wound on the pair of rod-like cores is also applied to the electron beams. The VCR correction by means of the barrel magnetic fields is based on the same principle as that of the conventional correction.

Since the first and second deflection current systems DC1 and DC2 are connected in parallel with each other, as the current is shunted to the second deflection current system DC2 because the diodes are turned on, an increase in current $I_{10}$ of the first deflection current system DC1 is declined or the current $I_{10}$ is decreased. The second saturation control coil 75b generates a magnetic field having a polarity opposite to that of the magnetic field generated by the first saturation control coil 75a. Thus, after the diodes are turned on, a magnetic field $H_{v2}$ generated by the second saturation control coil 75b is rapidly increased, as shown in FIG. 12C. Therefore, when the diodes are turned on, the deflection current is shunted to the second deflection current system DC2, and the second saturation control coil 75b starts to generate a magnetic field having an opposite polarity. Also, since the current flowing through the first deflection current system DC1 is decreased, an increase in magnetic field generated by saturation control coil 75a is declined. As a result, the magnetic field generated by the saturation control coil as a whole is decreased when compared to the magnetic field obtained by only the first saturation control coil 75a before the diodes are turned on, and the external magnetic field applied to the impedance control coils is decreased. Therefore, the correction amount of the cross convergence error can be changed between the intermediate portion and the upper and lower end portions of the screen.

The correction pattern of the cross convergence error can be changed by adjusting the magnetic fields generated by the first and second saturation control coils 75a and 75b and the scanning points of the electron beams when the diodes 91 and 92 are turned on, thereby forming an appropriate correction pattern. More specifically, when the curve of the correction amount has a gradient as shown in FIG. 3C, the gradient can be adjusted by the amplitude of the magnetic field generated by the first saturation control coil 75a, the position on the screen where the maximum correction amount is obtained can be adjusted by the turn-on positions of the diodes, and the gradient of the curve of the correction amount after the diode 91 or 92 is turned on can be adjusted by a shunt ratio of the first and second deflection current systems or the strength of the magnetic field generated by the second saturation control coil 75b. The magnetic field can be adjusted by changing the shunt ratio of the first and second deflection current systems and the number of turns of each saturation control coil.

In this embodiment, the choke coil 81 is arranged in the circuit. The choke coil 81 adjusts the induced electromotive force generated in a closed circuit constituted by the first and second deflection current systems. That is, the sum of the induced electromotive forces generated by coils in other closed circuits is adjusted by the induced electromotive force generated by the choke coil 81, thereby relaxing the transitional induced current at start of scanning.

In this embodiment, the configuration of the saturable reactor, especially the configuration of the horizontal deflection signal generating circuit 60, is not described in detail. However, any type of conventional saturation reactor can be utilized as far as its saturation control coils connected to the vertical deflection coils have arrangements as shown in this embodiment.

In this embodiment, concerning correction of the coma VCR, positive correction is performed in the intermediate portion of the screen by one of two pairs of sub coils, and is performed in the intermediate portion toward the upper and lower end portions of the screen by the other pair of sub coils. The magnetic fields generated by the two pairs of sub coils can be set in accordance with the pattern of the coma error VCR, and this embodiment can also be applied to decreasing the correction amount of the coma VCR in the intermediate portion toward the upper and lower end portions of the screen by performing negative correction.

In FIGS. 10 and 11, the saturation control coils and the sub coils are connected to the vertical deflection coils. However, the saturation control coils may not be connected to the vertical deflection coils to directly flow the vertical deflection current.

As described above, according to this embodiment, the various types of deviation patterns of the cross convergence errors can be corrected by constituting the sub coils for performing VCR correction with two pairs of sub coils, providing two saturation control coils as the saturation control coil of the saturable reactor, and controlling one pair of sub coils and one of two pairs of saturation control coils by diodes. Circuit design for this purpose can be easily performed.

Embodiment 4

Figure 13:
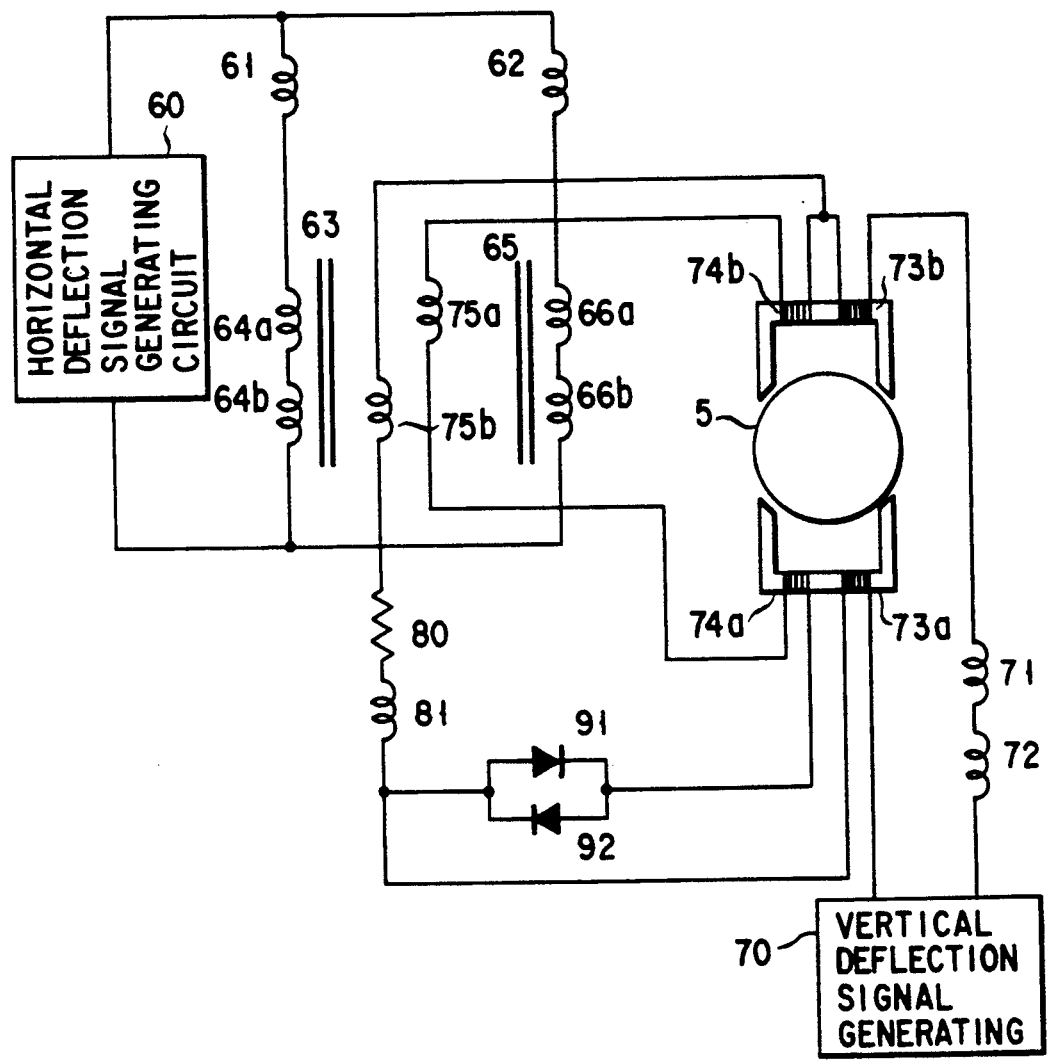
FIG. 13 is a schematic circuit diagram showing the circuit configuration of still another embodiment of the present invention.

Still another embodiment of the present invention will be described. Embodiment 3 described above shows an arrangement in which the sub coils of each of two pairs are wound on different cores. However, one sub coil of one of the two pairs can be wound on the same core as that on which the other sub coil of the other of the two pairs is wound. FIG. 13 shows a circuit configuration in which one sub coil of one of the two pairs is wound on the same core as that on which the other sub coil of the other of the two pairs is wound. Note that in FIG. 13 the same reference numerals indicate the same parts as in FIG. 10. In this embodiment, two pairs of sub coils are wound on one pair of U-shaped cores. Before the diodes are turned on, VCR correction is performed by the pin-cushion magnetic fields formed by one pair of sub coils, and after the diodes are turned on, pin-cushion magnetic fields formed by the other pair of sub coils are applied. Connection among the sub coils to be connected to the vertical deflection signal generating circuit, the saturation control coils, the diodes, the resistor, and the like is the same as that shown in FIG. 11, and the operational principle of this embodiment is the same as that described in above Embodiment 3.

Embodiment 5

Both Embodiments 3 and 4 described above are related to a deflecting apparatus for a color cathode ray tube. A color cathode ray tube apparatus according to an embodiment of the present invention will be described.

The overall configuration of the color cathode ray tube apparatus is the same as that shown in FIG. 1, and its deflecting apparatus for deflecting the electron beams is the same as that shown in FIG. 2.

The deflecting apparatus of this embodiment has a circuit configuration as that shown in FIG. 10 or 13. Accordingly, its detailed arrangement and function are the same as those of Embodiments 3 and 4. The coma VCR and the cross convergence error can be corrected simultaneously, and the correction pattern at this time can be adjusted by a shunt ratio of the first to second deflection current systems, the number of turns of the first and second saturation control coils, and the like.

The screen distortion cannot sometimes be sufficiently corrected even if optimum design is performed by using the circuits indicated in some of the embodiments described above. That is, an imbalance to the polarity of the deflection current sometimes occurs due to the influences of the difference between the turn-on/turn-off characteristics of the diodes, the difference between the upper and lower blank portions of vertical deflection of the color cathode ray tube, and the like. An imbalance can be caused by asymmetry in design of a deflection yoke and a color cathode ray tube. In addition, an imbalance can be caused by a manufacturing variation in the deflection yoke or the color cathode ray tube. These imbalances cause correction imbalance between the upper and lower sides of the screen, thus degrading the convergence characteristics of the color cathode ray tube.

These imbalances can be decreased by using a pair of diodes having different operating voltages or by adhering a magnetic or magnet piece to the deflection yoke portion. When, however, a pair of diodes having different operating voltages are used, problems such as an increase in types of diode pairs to be used, an increase in selection range of the operating voltage, and the like are posed. Also, when the imbalances are to be corrected by adhering a magnetic or magnet piece to the deflection yoke portion, only an imbalance in the peripheral portion of the screen can be mainly corrected, and an imbalance in the central portion of the screen cannot be easily corrected.

In this case, an impedance element is connected in series with at least one of parallel-connected diodes having opposite polarities, thereby adjusting the impedance.

Figure 14:
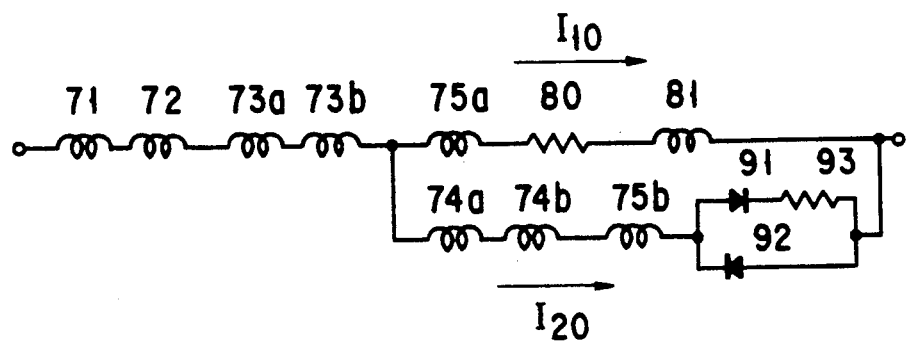
FIG. 14 is a block diagram showing the circuit of a deflecting apparatus according to still another embodiment of the present invention.
Figure 15:
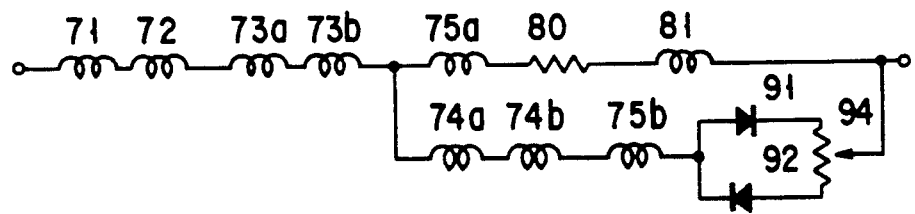
FIG. 15 is a block diagram showing a circuit of a deflecting apparatus according to a modification of the embodiment of FIG. 14.
Figure 16A:
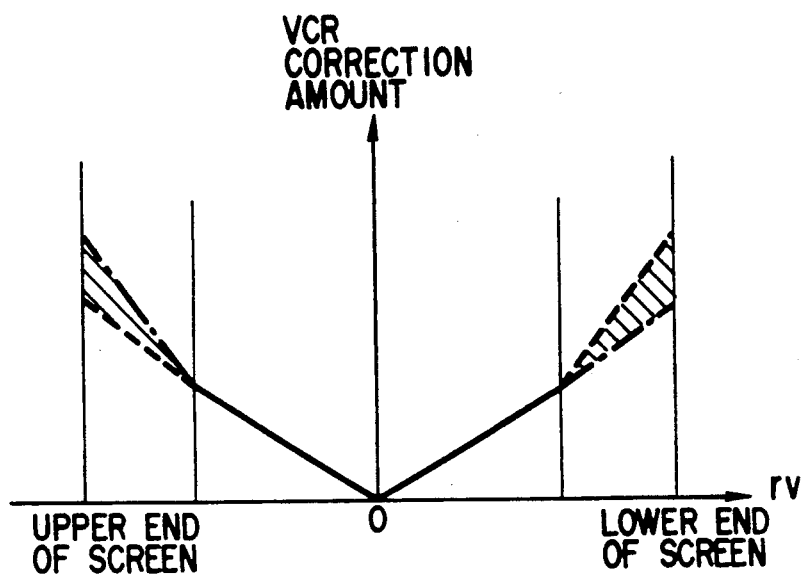
FIGS. 16A and 16B are graphs showing the amounts of correction of the coma error VCR and the cross convergence error realized by the circuit shown in FIG. 14.
Figure 16B:
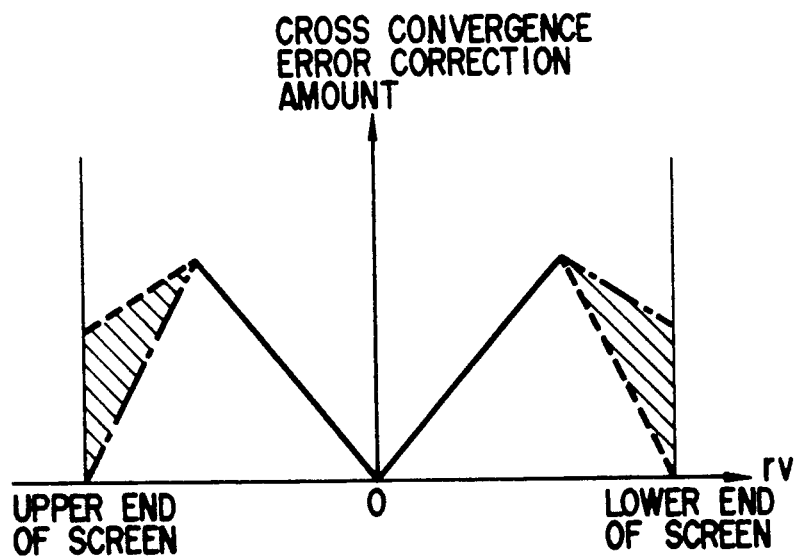

More specifically, when a resistor 93 is connected in series as an impedance element with one of parallel-connected diodes having opposite polarities, as shown in FIG. 14, the diode resistance obtained when the diode to which the impedance element is connected is operative is increased. Also, when a resistor 94 is connected as shown in FIG. 15, the resistance of the diode pair can be controlled. Then, the shunt ratio of the current $I_{10}$ to the current $I_{20}$ can be adjusted between the upper and lower sides of the screen. More specifically, when an imbalance occurs in shunt ratio between the upper and lower sides of the screen, modulation characteristics well-balanced between the upper and lower sides of the screen can be obtained by connecting an appropriate impedance element in series with one diode. Hence, in a color cathode ray tube having an intentionally designed imbalance, the resistance is adjusted in accordance with the imbalance of a necessary correction amount to adjust the correction pattern within the regions indicated by hatched lines in FIGS. 16A and 16B, thereby improving the image characteristics.

Figure 17:
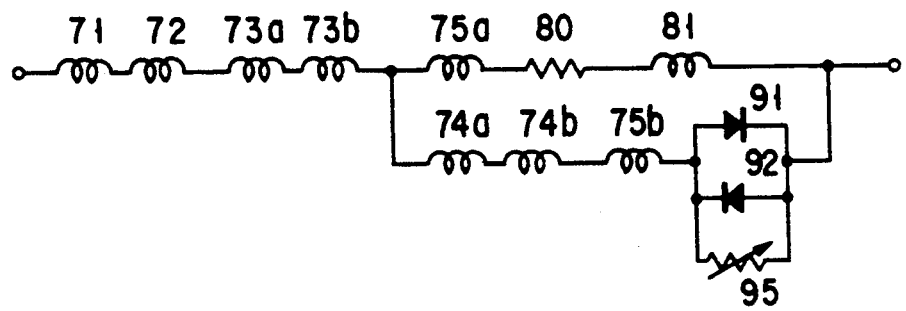
FIG. 17 is a block diagram showing a circuit of a deflecting apparatus according to still another embodiment of the present invention.

Also, a variable resistor or a variable inductance element may be connected in parallel with a pair of diodes having opposite polarities in a deflection signal generating circuit, as shown in FIG. 17, thereby controlling the modulation characteristics of the deflection current obtained by the diode pair.

In FIG. 17, a bypass circuit is connected in parallel with the pair of diodes. Therefore, even when the diodes are insulated, the current $I_v$ is shunted into the first and second defecting systems in accordance with the impedance of the bypass circuit, and the current $I_2$ in FIG. 18 has a certain current value within the zero region. Similarly, the current $I_1$ is decreased by $I_v - I_2$, and the operating point of the diodes is shifted toward the end of the vertical axis.

Figure 18A:
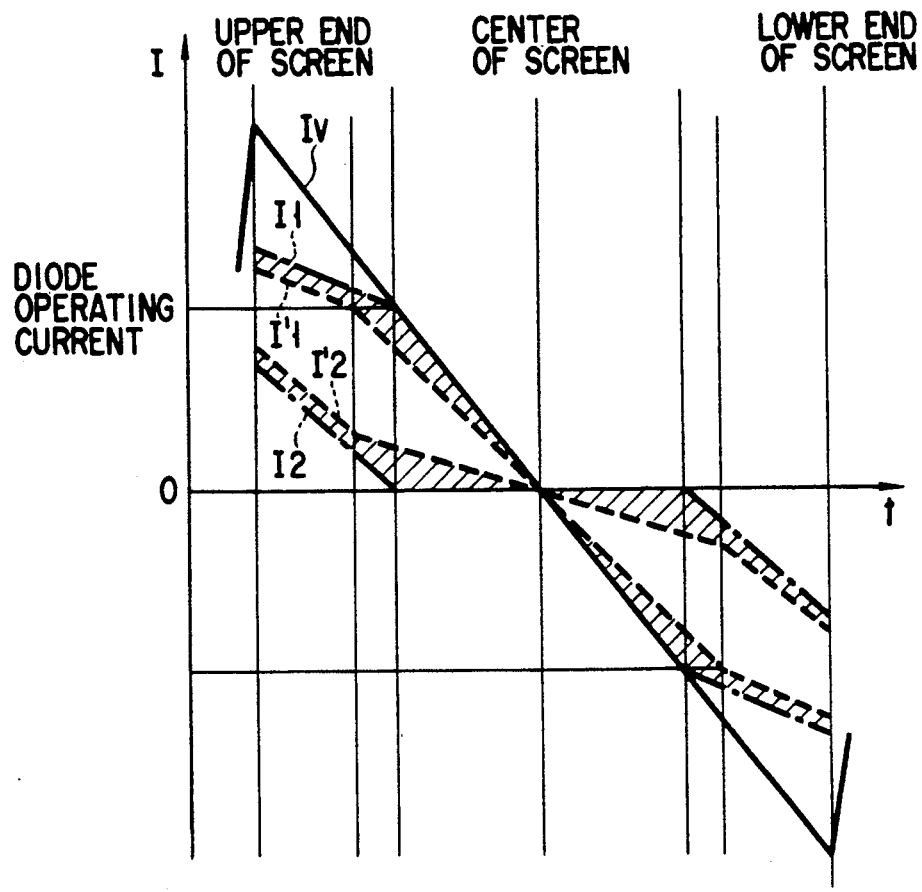
FIG. 18A is a graph for explaining the function realized by the circuit shown in FIG. 17, and FIGS. 18C and 18B are graphs showing the amounts of correction of the coma VCR and the cross convergence error, respectively, realized by the circuit shown in FIG. 17.
Figure 18B:
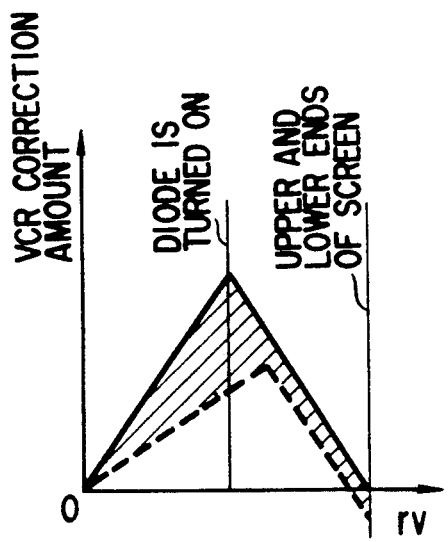
Figure 18C:
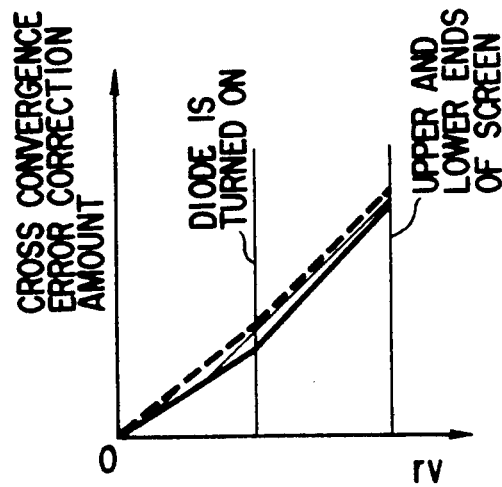

FIG. 18A shows changes in currents $I_1$ and $I_2$ caused by the presence/absence of the bypass circuit, and FIGS. 18B and 18C show changes in correction patterns of the coma error VCR and the cross convergence error, respectively. The resistance of the bypass circuit is adjusted in accordance with the imbalance of a necessary correction amount to adjust the correction pattern with in the regions indicated by hatched lines in FIGS. 18B and 18C.

In this manner, the correction pattern of mainly the diode non-operative region can be changed by the bypass circuit. Since this bypass circuit does not generate an induced electromotive force or hardly changes the resistance in the closed circuit portion, it does not cause an adverse influence by the induced current of the closed circuit portion when scanning is started. Namely, since re-adjustment of the choke coil is not needed, the impedance of the bypass circuit can be independently adjusted, so that the bypass circuit can easily serve as the means for absorbing the variation in the color cathode ray tube.

In FIGS. 14, 15, and 17, sub coils for correcting the coma VCR are also connected. However, these sub coils need not be connected so that only the cross convergence error can be corrected.

As has been described above, according to the present invention, a saturation control coil assembly constituting a saturable reactor is constituted by two parallel-connected coils having opposite directions, and the reverse-direction saturation control coil is controlled by diodes, so that screen distortion correction can be performed even when screen distortions at upper and lower intermediate portions of the screen are larger than those at upper and lower end portions of the screen. Furthermore, a desired correction pattern can be obtained by controlling the turn-on timings of the diodes and the shunt ratio of the deflection currents.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept a defined by the appended claims and their equivalents.

What is claimed is:

1. An apparatus for deflecting electron beams in accordance with first and second deflection currents comprising:

a pair of first deflection coils, energized by the first deflection currents, for generating a first magnetic field to deflect the electron beams in a first direction;

at least one second deflection coil, energized by the second deflection current, for generating a second magnetic field to deflect the electron beams in a second direction;

first and second impedance control coils connected to first deflection coils and having first and second impedances, respectively;

a saturable core on which the impedance control coils are wound;

a first saturation control coil, supplied with the second deflection current and magnetically coupled with the first and second impedance control coils, for generating a first control magnetic field having a polarity and changing the first and second impedance of the first and second impedance control coils to restrict the level of the first deflection current flowing through the first deflection coils;

a second saturation control coil, connected in parallel with said first saturation control coil and magnetically coupled with the first and second impedance control coils, for generating a second control magnetic field having an opposite polarity to that of the first control magnetic field and changing the first and second impedance of the first and second impedance control coils to restrict the level of the first deflection current flowing through the first deflection coils; and a parallel diode circuit connected in series with the second saturation control coil and including a pair of parallel-connected diodes having opposite directions.

2. An apparatus according to claim 1, further comprising:

a resistor connected in series with the first saturation coil.

3. An apparatus according to claim 1, wherein the first saturation control coil is connected to the second deflection coil.

4. An apparatus according to claim 1, further comprising a variable resistor connected in parallel with said parallel diode circuit.

5. An apparatus according to claim 1, further comprising a resistor connected in series with at least one of said pair of diodes of said parallel diode circuit.

6. An apparatus according to claim 1, further comprising two pairs of sub coils for generating an auxiliary magnetic field in synchronism with the current flowing through said second deflection coil, one of said two pairs of sub coils being connected to said second deflection coil.

7. A color cathode ray tube apparatus comprising:

first signal generating means for generating a first deflection signal;

second signal generating means for generating a second deflection signal;

an in-line type electron gun assembly for generating a center beam and a pair of side beams that are aligned in line in a first direction;

a pair of first deflection coils, energized by the first deflection currents, for generating a first magnetic field to deflect the electron beams in a first direction;

at least one second deflection coil, energized by the second deflection current, for generating a second magnetic field to deflect the electron beams in a second direction;

first and second impedance control coils connected to first deflection coils and having first and second impedances, respectively;

a saturable core on which the impedance control coils are wound;

a first saturation control coil, supplied with the second deflection current and magnetically coupled with the first and second impedance control coils, for generating a first control magnetic field having a polarity and changing the first and second impedance of the first and second impedance control coils to restrict the level of the first deflection current flowing through the first deflection coils;

a second saturation control coil, connected in parallel with said first saturation control coil and magnetically coupled with the first and second impedance control coils, for generating a second control magnetic field having an opposite polarity to that of the first control magnetic field and changing the first and second impedance of the first and second impedance control coils to restrict the level of the first deflection current flowing through the first deflection coils; and a parallel diode circuit connected in series with the second saturation control coil and including a pair of parallel-connected diodes having opposite directions.

8. An apparatus according to claim 7, further comprising:

a resistor connected in series with the first saturation coil.

9. An apparatus according to claim 7, wherein the first saturation control coil is connected to the second deflection coil.

10. An apparatus according to claim 5, further comprising a variable resistor connected in parallel with said parallel diode circuit.

11. An apparatus according to claim 5, further comprising a resistor connected in series with at least one of said pair of diodes of said parallel diode circuit.

12. An apparatus according to claim 5, further comprising two pairs of sub coils for generating an auxiliary magnetic field in synchronism with the current flowing through said second deflection coil, one of said two pairs of sub coils being connected to said second deflection coil.

* * * * *